Jan. 27, 1931. W. BARBER 1,789,962
SPOKE WHEEL AND METHOD OF MAKING SAME
Filed March 22, 1924 3 Sheets-Sheet 2
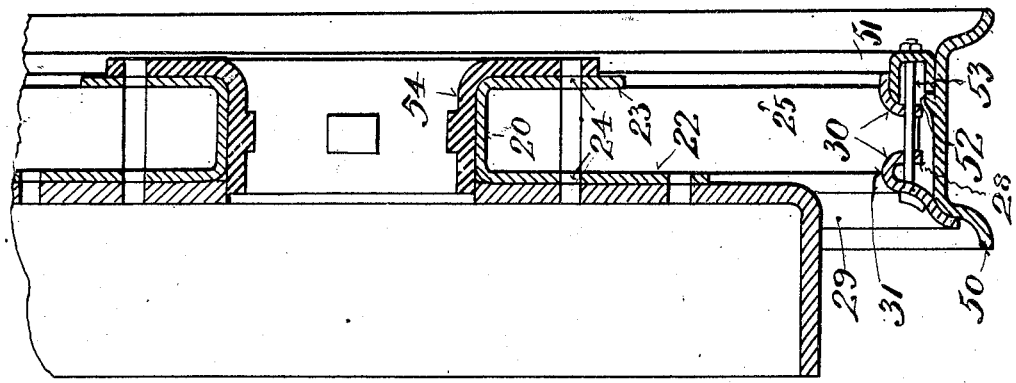
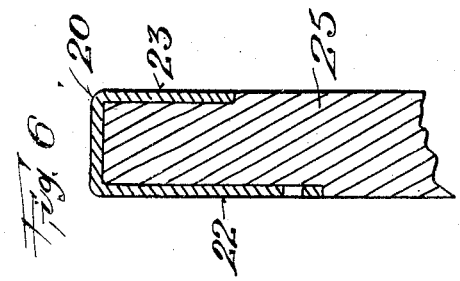
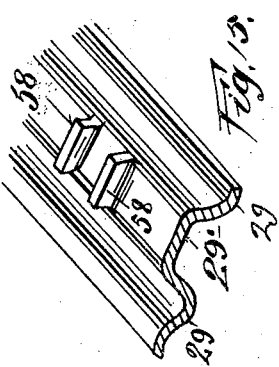
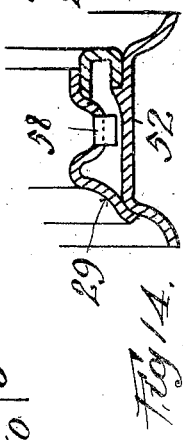
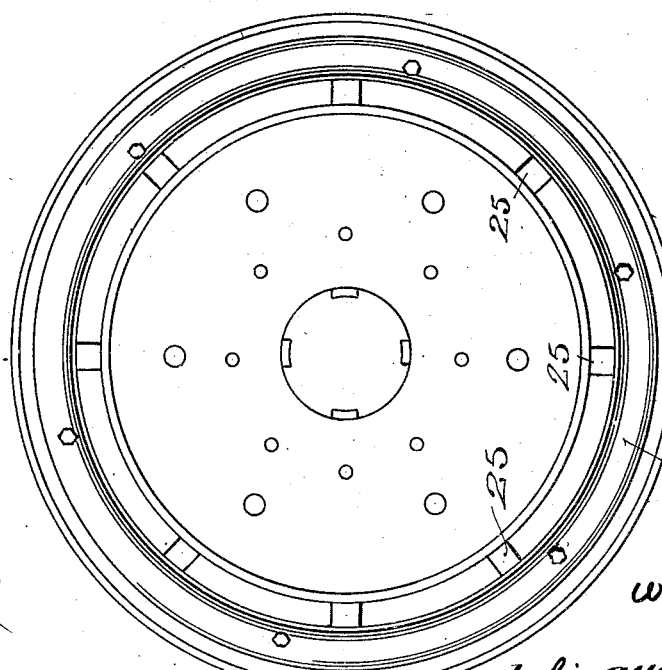
Inventor
William Barber
by his attys Darby & Darby Jan. 27, 1931. W. BARBER 1,789,962
SPOKE WHEEL AND METHOD OF MAKING SAME
Filed March 22, 1924   3 Sheets-Sheet 3
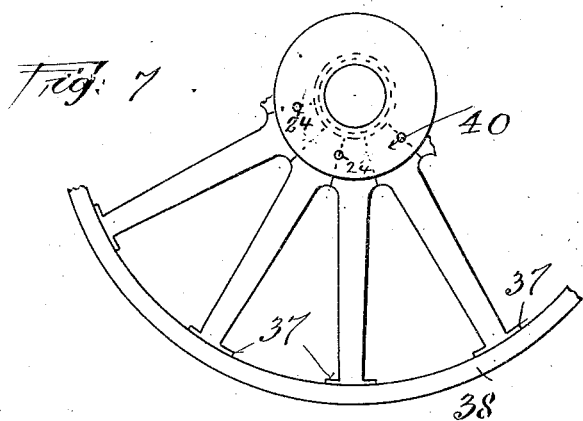
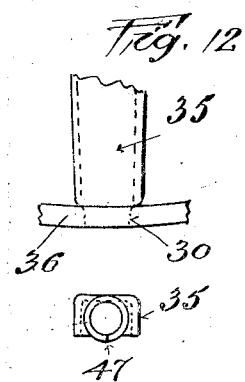
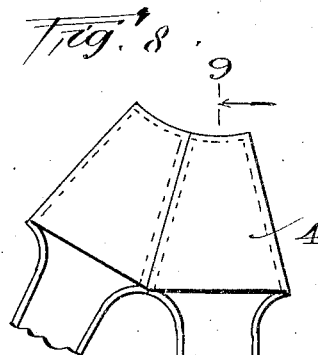
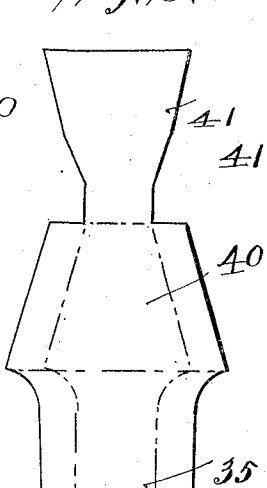
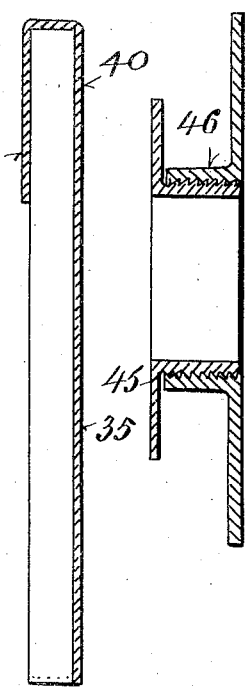
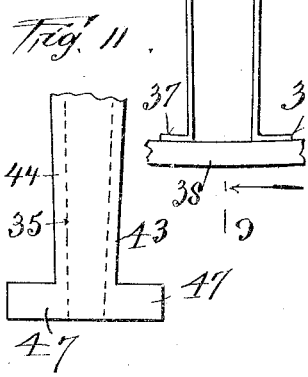
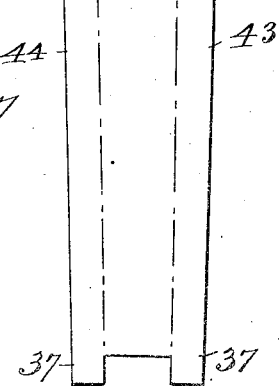
INVENTOR
William Barber
BY Darby & Darby
his ATTORNEYS Patented Jan. 27, 1931

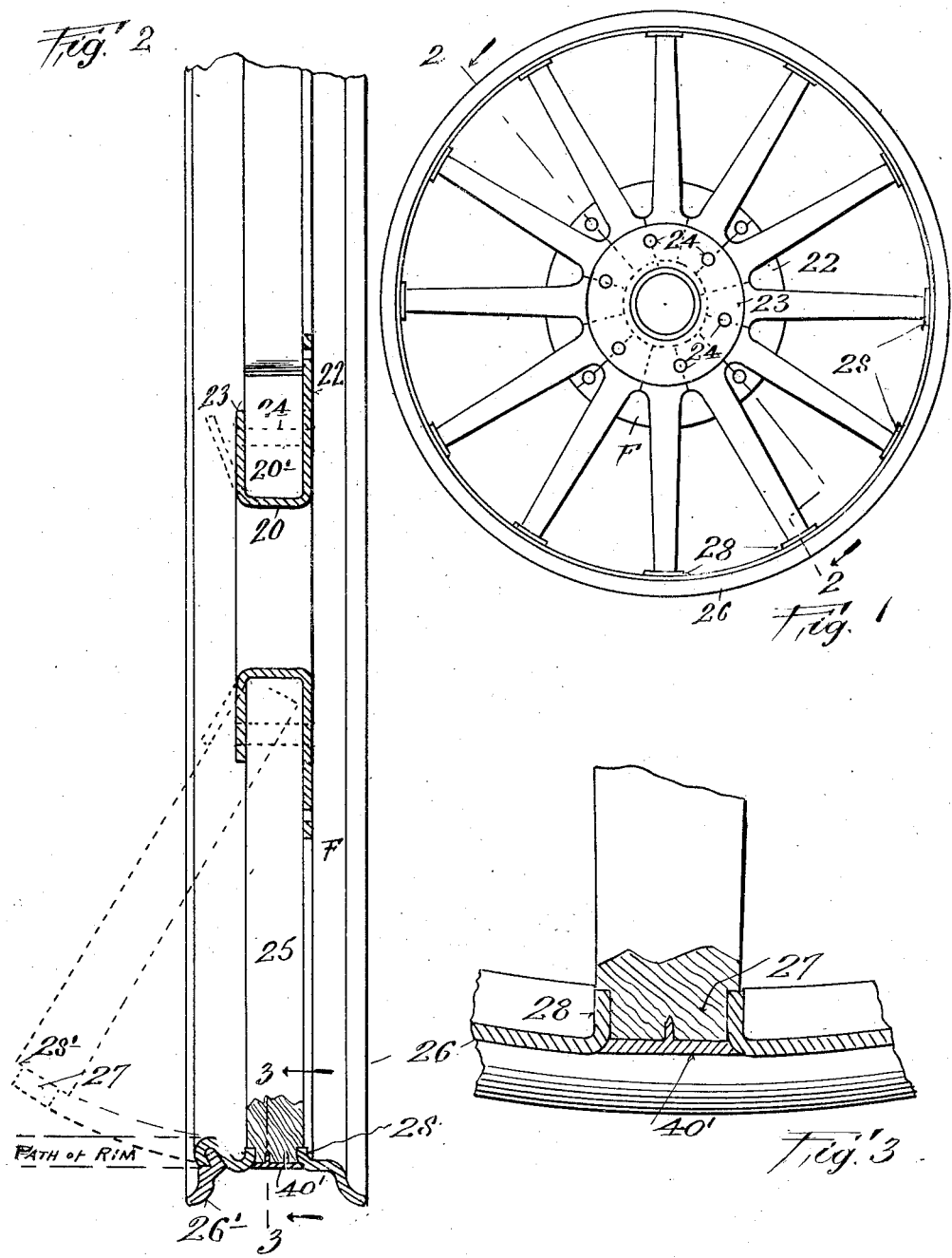

1,789,962

UNITED STATES PATENT OFFICE

WILLIAM BARBER, OF BROOKLYN, NEW YORK, ASSIGNOR, BY MESNE ASSIGNMENTS, TO STEEL WHEEL CORPORATION, OF LANSING, MICHIGAN, A CORPORATION OF MICHIGAN

SPOKE WHEEL AND METHOD OF MAKING SAME

Application filed March 22, 1924. Serial No. 701,105.

This invention relates to improvements in wheel construction, whereby a substantial and enduring spoke wheel is quickly assembled and cheaply constructed regardless whether the spokes be of wood or of metal.

Among the objects of my invention are, therefore, simplicity and cheapness of construction, ease of assembly, a substantial saving in material and consequently the production of wheels of less weight with also a saving on tires and wear on the vehicle. By my method of wheel construction, I make a firm assembled structure which has greater resiliency than the artillery type of wooden wheel or even the disk wheel, and which is not subject to creaky noises on account of corrosion or loose parts.

Other advantages and objects will appear hereinafter from the mode of construction and from the wheel structure, which are illustrated in the accompanying drawings, and in which:—

Fig. 1 is a view in elevation of a wheel made in accordance with the principles of my invention.

Fig. 2 is a view taken on line 2—2 of Fig. 1, looking in the direction of the arrows.

Fig. 3 is a view taken on line 3—3 of Fig. 2.

Fig. 4 is a view in elevation of a wheel made in accordance with my invention, wherein is provided a felly band with a detachable rim and having the brake-drum applied.

Fig. 5 is a view taken on line 5—5 of Fig. 4.

Fig. 6 is a view of a portion of a wooden spoke wherein the seat for the central holding or hub flanges is countersunk.

Fig. 7 is a view of a portion of a wheel similar to that shown in Fig. 1, but having metal spokes which are spot welded instead of being riveted.

Fig. 8 is an enlarged view showing metal spokes.

Fig. 9 is a view taken on line 9—9 of Fig. 8.

Fig. 10 is a view of a blank from which the metal spoke is formed.

Fig. 11 is a view of a portion of the metal spoke showing a slightly different form of construction.

Fig. 12 is a view of the same, wherein the spoke has been shaped and seated in its felly or tire rim holding member.

Fig. 13 is a sectional view of an adjustable hub spoke holding member, and Figs. 14 and 15 show a modified form of rim.

Fig. 14 is a fragmentary cross-sectional view of another form of felly-rim connection.

Fig. 15 is a fragmentary perspective view of a felly showing another type of spoke seat.

Like numerals refer to similar parts throughout the several views.

To carry out my invention, I provide suitable hub holding and rim or felly spoke holding members, wherein the spokes are all assembled and simultaneously brought into their final securing position. In this position the spokes and seating members are caused to be fixed and securely held, as will be more fully shown below. The instrumentalities whereby I carry out my mode of procedure may vary in accordance with the result sought or the finished article which it is desired to produce. And while I have described a preferred mode of procedure and shown and describe specific constructions for accomplishing my purpose, I do not thereby desire to be understood as thus limiting myself.

In preferred forms of spoke holding members and spoke constructions, the spoke holding or hub member 20 is provided with a circular groove or spoke seating channel 20'. This channel is formed by the larger or inside flange 22 and, preferably, though not necessarily, a smaller outside flange 23. The outside flange may be made up of sections, if desired, and both members are provided with registering holes 24 for receiving the hub bolts (not shown) when the wheel is mounted on the hub. This form of construction may be applied to both wood and metal spokes. If, however, metal spokes are used spot welding or brazing may be used to further secure the spokes. When the type of hub or spoke holding member just described is used, the outside flange is in open position, as indicated by the dotted lines in Fig. 2, for receiving the hub ends of the spokes 25, preparatory to assembling the wheel in accordance with my method of construction. In some instances, however, I prefer to use a separable spoke holding member at the center, as will be more fully stated below.

The peripheral or rim holding member for the outer spoke ends may constitute the tire rim, or it may be a felly with a detachable tire rim suitably held thereon. The former type is exemplified by the construction illustrated in Fig. 2, and the latter by that of Figs. 5 and 14. In all of the different forms of construction, however, there are provided spoke seats into which the ends 27 of spokes 25 are pressed when the wheel is assembled.

In preferred forms of construction, the peripheral holding members are provided with spoke seats in the form of bosses or punchings. The bosses 28 may extend inwardly as in Figs. 2 and 3, or they may extend outwardly as in felly 29 of Fig. 5. Where the bosses extend inwardly they will form seats for spoke shoulders. Where they extend outwardly the punched depressions will form seats 30 in felly 29 for the spoke shoulders 31. Or again, a groove 29' may be formed in felly 29, as in Fig. 15, for the shoulder of spokes 25 to be seated thereagainst, and the end of the spoke will fit into the opening of the felly formed by the upset portions 58.

In all cases will the seats provide support against lateral thrust, and the bosses and upset portions will aid in holding the spokes firmly against radial stresses forwardly and rearwardly. From this it will be apparent that where the peripheral holding member is the tire carrying rim also, as the quick detachable rim 26 and its lock ring 26', a very simple and inexpensive construction is provided. Where the felly type forms the peripheral member, a demountable rim is used. Examples of the former construction are illustrated by Figs. 2 and 3, and of the latter by Figs. 5 and 14. Any of the types of the forms just described are suited for either wood or metal spokes. Where metal spokes are used they may be seated the same as the wooden spokes, in the manner shown in Fig. 12, for example, or they rest upon the inner surface of the peripheral member shown in Fig. 7 for example.

In designing the wheel structure, the spokes are made too long by several thousandths of an inch so that the assembled structure is held together firmly under compression. The mode of assembling my wheel structure comprises arranging the spokes in the open channel of the hub holding member in inclined position, indicated generally by the dotted lines in Fig. 2. The flange member 23 is also in opened position, as is shown in dotted lines. The peripheral member is adjusted and lowered over the descending spoke ends so that the spoke ends engage their respective spoke seats described above. Sufficient pressure is now applied to shape the wheel and to close the hub channel. Any suitable means, as a hydraulic press (not shown) may be used for the final shaping step. The wheel is now finished and ready to be mounted on the hub, in the manner indicated above. Where metal spokes are used the parts of contact may be spot welded or brazed to further secure the parts together.

When metal spokes are used, they may be of varied construction, and the mode of assembly is substantially as outlined above. Preferred forms of spokes however are U-shaped in cross-section and are either the flat-footed type or the round seated type, illustrated respectively in Figs. 8 and 12. These spokes are made from blanks (see Figs. 10 and 11) and comprise a head 40, the spoke body 35 and the foot or seating end for the peripheral holding member. The round seated spokes are similar in this respect to the wood spokes and may be used with the peripheral holding members illustrated in Figs. 2, 3, 5 or 12. The flat-footed spokes, on the other hand, as stated above, require no spoke holes and the spokes are therefore seated directly on the inner surface of the peripheral holding member which, like in the former case, may be of the quick detachable type or the detachable rim type.

The blanks are stamped from sheet metal, in the usual manner well known to the art, and are then shaped by bending the skirts 43 and 44 at right angles to the plane of the blank to form the U-shaped structure named above. Tab 41 is bent over end-wise to form a closed head of proper size and shape to fit in and fill the channel of hub spoke holding member. Feet 37 are formed for the flat-footed type, and the parts 47 are rounded, as indicated by Fig. 12 for the round seated type. The wheel is assembled, as before, by placing the heads in the hub spoke holding member, which has its channel open; that is, it is either bent up or, if the separable holding member (of Fig. 13) is used, the spoke holding member 45 is unscrewed sufficiently to readily admit the spoke heads into the hub channel 46. The spoke ends and peripheral holding members are then brought together, as stated above, by causing the foot-ends of the spokes to engage with the peripheral holding member and to be then pressed into position for the finished wheel. In this position the parts are secured by riveting or welding, as stated above, or by merely screwing down the hub holding member.

When wooden spokes are used with the quick detachable rim, it is desirable to provide a finished surface. For this purpose I provide cap members 40' which are tacked on to the spoke ends. Where the detachable tire carrying rim 50 is used the same may be secured by a wedging seating ring 51 of U-shaped section, engaging the felly seat 30 on the one side and the abutting ledge 52 on the other. This ring is held in locking position by bolts 53 and places the demountable rim under radial stress.

The hub spoke holding member may be of any desired construction to fit any standard hub member 54 whereby the wheel may be of the quick detachable type or not, as may be desired.

Having now described my invention, what I claim as new and useful, of my own invention, and desire to secure by Letters Patent, is:—

1. The method of constructing spoke wheels, which comprises providing a hub spoke holding member with an open channel, and a felly spoke holding member with spoke seats, then arranging spokes in wheel forming position with one end thereof in the open channel of said hub holding member, then bringing the other end of said spokes into engagement with the felly spoke holding member, and bringing said ends and holding member into the plane of the hub holding member, and closing said channel.

2. The method of constructing spoke wheels, which comprises providing a hub spoke seating member and a peripheral spoke seating member, the hub spoke seating member having an open channel with a bendable face, then arranging spokes in wheel forming position with one end thereof in the open channel of said hub seating member, then bringing the other end of said spokes into engagement with the other of said seating members to cause the ends of the spokes and the seating member to be moved into the plane of the first seating member, and fastening the spokes thus assembled into wheel formation.

3. In a spoke wheel a central hub spoke-holding member having a channel, spokes having heads to fit into said channel, an outer peripheral spoke holding member having sockets wherein the ends of the spokes are held, a demountable tire carrying rim seated on said peripheral spoke holding member, and means for locking said demountable rim in position, said means abutting against said sockets to wedgingly seat said demountable rim.

4. The method of constructing spoke wheels, which comprises providing the central hub member with outwardly facing spoke seats and the surrounding felly member with inwardly facing spoke seats, one at least of the two concentric sets of seats presenting an opening V-shaped with diverging walls to accommodate the spoke ends with the spokes disposed at an oblique angle to the wheel plane, arranging the full complement of spokes in divergent conical relation with their ends in the two sets of seats, bringing the hub and felly and seated spokes collectively into a common plane, and clamping the walls of the V-shaped seats upon the spoke ends to form an assembled wheel.

5. The method of constructing spoke wheels, which comprises providing the central hub member with outwardly facing spoke seats and the surrounding felly member with inwardly facing spoke seats, one at least of the two concentric sets of seats presenting an opening having a width sufficiently in excess of the spoke width to enable the positioning of the spoke therein at an oblique angle to the wheel plane, arranging the full complement of spokes in divergent conical relation with their ends in the two sets of seats, bringing the hub and felly and seated spokes collectively into a common plane, and contracting the wider set of seats upon the spoke ends to form an assembled wheel.

In testimony whereof I have hereunto set my hand on this 18th day of March, A. D. 1924.

WILLIAM BARBER.